3,282,952
PROCESS FOR PREPARING A 4-LOWER ALKYL-5-LOWER ALKOXY-OXAZOLE AND INTERMEDIATE
Sidney Frank Schaeren, Bottmingen, Switzerland, assignor to Hoffmann-La Roche Inc., Nutley, N.J., a corporation of New Jersey
No Drawing. Filed June 29, 1965, Ser. No. 468,098
Claims priority, application Switzerland, July 6, 1964, 8,853/64
14 Claims. (Cl. 260—307)

The present invention relates to novel chemical processes and to novel intermediates prepared when performing the said novel chemical processes. More particularly, the present invention relates to novel chemical processes for the preparation of 4-methyl-5-lower alkoxy oxazoles and to novel boron trifluoride adducts of N-acyl alanine esters, intermediates useful in such preparative procedures.

Heretofore, 4-methyl-5-lower alkyloxy oxazoles have been prepared by a process which involves dehydrating a N-acyl ester of alanine or enol ethers thereof. However, such prior art methods suffer from the defect of resulting in low yields of the desired 4-methyl-5-lower alkoxy oxazoles and unwanted side products. Particularly, when esters of N-formyl alanine are dehydrated by prior art techniques does the problem of unwanted side products (due to the formation of an isonitrile) and the attendant problem of low yields becoming significantly troublesome.

It is an object of the present invention to overcome the disadvantages inherent in such prior art procedures and thus, provide a method for synthesizing the desired 4-methyl-5-lower alkoxy oxazoles in good yields, from a commercial point of view and in an economical manner.

In achieving this objective within the purview of the present invention, it has been found that if an N-acyl-alanine ester or its corresponding enol ether is first reacted with boron trifluoride or an etherate thereof whereby to form a boron trifluoride adduct of the N-acyl-alanine ester or a boron trifluoride adduct of an enol ether thereof and subsequently, if the resulting adduct is dehydrated, the desired 4-methyl-5-lower alkoxy oxazoles are obtained in good yields and by a preparative technique which is eminently well suited for utilization on a technical scale.

Thus, the present invention relates to a process for the preparation of compounds of the formula

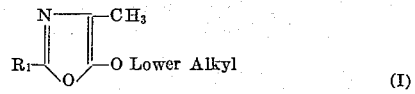

wherein $R_1$ is selected from the group consisting of hydrogen and lower alkyl which comprises reacting a compound selected from the group consisting of compounds of the formula

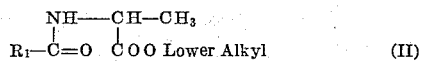

wherein $R_1$ is as above and the enol ether thereof of the formula (IIa)
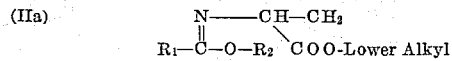

wherein $R_1$ has the same meaning as ascribed thereto hereinabove and $R_2$ is a hydrocarbon radical, with a member selected from the group consisting of boron trifluoride and, particularly, an etherate thereof of the formula

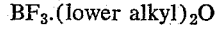

$$BF_3 \cdot (\text{lower alkyl})_2O$$

whereby to prepare an adduct selected from the group consisting of the boron trifluoride adduct of compounds of Formula II above and the boron trifluoride adduct of compounds of Formula IIa above and subsequently dehydrating the so-formed adduct with a suitable dehydrating agent. By proceeding accordingly, it is assured that compounds of the Formula I above are obtained in good yields. The adducts formed during the ensuring reaction are novel products and, hence, constitute a part of the present invention.

The first stage of the process schematically illustrated above, i.e., the conversion of the compounds of Formulas II and IIa above into borontrifluoride adducts thereof is efficaciously accomplished by passing gaseous boron trifluoride or an etherate thereof into a solution of a N-acyl lower alkyl ester of the Formula II above or an enol ether thereof of the Formula IIa above. Any suitable inert organic solvent can be employed to prepare the solution of a compound of Formula II above or the compound of Formula IIa above required in the first stage of the process of the present invention. A solvent especially preferred for this purpose is choroform. Advantageously, a boron trifluoride dialkyl etherate, and most preferably, boron trifluoride diethyl etherate, is employed to prepare the adduct.

The conversion of compounds of Formula II above and IIa above into the $BF_3$ adduct thereof can be carried out at any suitable temperature such as at room temperature or at a temperature above or below room temperature. A temperature range from about $-10°$ C. to about $30°$ C. is preferred. The preparation of the adduct in the manner outlined hereinabove proceeds exothermically. Accordingly, the first stage is advantageously run in the cold by the utilization of any conveniently available suitable cooling means, e.g., an ice bath and the like.

In an especially advantageous aspect of the present invention, the borontrifluoride portion of the adduct and the N-acyl alanine ester portion of the adduct are present therein in a molar ratio of about 1:1. To assure such a molar ratio, it is preferred to use a boron trifluoride etherate, preferably, boron trifluoride diethyl etherate, in a slight excess above the theoretical quantity required for the preparation of the 1:1 adduct. Preferably, the boron trifluoride or an etherate thereof is provided in an excess of about 2 percent above the theoretical amount.

The adduct obtained evidences the propensity to withstand degradation and thus, is highly stable. Its stability renders it capable of being stored for fairly long periods of time. Of even greater significance is the fact that the yields of the desired oxazoles of Formula I above are particularly good when the said adduct to be dehydrated contains the alaninate portion and the boron trifluoride portion in the preferred molar ratio of 1:1.

In an especially preferred mode of carrying out the process of the present invention N-formyl ethyl alaninate is used as a starting material. In this manner, 4-methyl-5-ethoxyoxazole is obtained as the end product. 4-methyl-5-ethoxyoxazole is extremely useful as an intermediate in the preparation of pyridoxine (vitamin $B_6$).

When compounds of Formulas II and IIa above wherein $R_1$ is lower alkyl are utilized as starting materials, there is obtained 2-lower alkyl-4-methyl-5-lower alkoxy oxazoles (for example, 2,4-dimethyl-5-ethoxy oxazole). Such 2-lower alkyl-4-methyl-5-lower alkoxy oxazoles are intermediates useful in technically interesting synthesis.

The second stage of the process illustrated schematically hereinabove, i.e., the dehydration of the adduct to a compound of Formula I above, proceeds efficaciously in the presence of any suitable dehydrating agent. Representative of dehydrating agents suitable for the purposes of the present invention are phosphorus pentoxide, phosphorus pentachloride, phosphorus trichloride, phosphorus oxychloride, polyphosphoric acids, thionyl chloride and the like. Preferred among the many dehydrating agents which are capable of dehydrating the boron trifluoride adduct is phosphorus pentoxide. Advantageously, when utilizing phosphorus pentoxide, 2.5 moles thereof should be used per mole of the adduct to be dehydrated. The dehydration is accomplished at any suitable temperature. However, elevated temperatures are preferred. It is most preferred to run the reaction under refluxing conditions. Generally, the dehydration is run in the atmosphere of an inert gas such as argon. An inert organic solvent such as chloroform may be utilized as the reaction medium in the said second stage.

The term "lower alkyl," as employed throughout the instant specification and claims is intended to connote straight or branched hydrocarbon having 1–7 carbon atoms therein. Illustrative of such are methyl, ethyl, propyl, isopropyl, butyl and the like.

The term "acyl" as used herein represents for example, a lower alkanoyl group such as formyl, acetyl, propionyl and the like.

The term "hydrocarbon radical" as employed in the definition of $R_2$ is intended to connote aralkyl groups, such as benzyl and phenethyl, and, particularly, lower alkyl groups.

The invention is further illustrated by way of the following examples which are illustrative but not limitative thereof. All temperatures given below are in degrees centigrade.

Example 1

The following operations are carried out under a hood.

91 g. of distilled boron trifluoride diethyl etherate in a 500 ml. four-necked round-flask which is fitted with a dropping funnel, a glass stirrer, a reflux condenser having a calcium chloride drying-tube and a thermometer are cooled to 10° in an ice-bath. To the so-called flask, there is added 84.2 g. of d,l-N-formyl methyl alaninate over a period of 10–15 minutes with care to prevent the temperature rising above 15°. The dropping funnel is then rinsed with 10 ml. of absolute ether and the rinse added to the reaction medium. The reaction medium is decanted into a 500 ml. round-flask and the ether distilled off in a rotary evaporator at 50° and under reduced pressure (water-jet pump). By proceeding accordingly, there is obtained the boron trifluoride adduct of d,l-N-formyl methyl alaninate in which the molar ratio of the methyl alaninate portion to the boron trifluoride portion is 1:1. The boiling point of the adduct is 135° C./0.02 mm. Hg; $n_D^{20}=1.4106$.

273 g. of phosphorus pentoxide, 205 g. of a filter-aid which is stable to boron trifluoride and 800 ml. of absolute chloroform are introduced with argon into a 2 liter four-necked round-flask which is equipped with a glass stirrer, a reflux condenser having a calcium chloride drying-tube, a dropping funnel and a gas inlet. To this mixture, there is carefully added with stirring at room temperature a mixture of 127.7 g. of the boron trifluoride adduct obtained as above and 1.9 g. of boron trifluoride diethyl etherate. The dropping funnel is rinsed with 100 ml. of chloroform and the resultant mixture is heated at reflux temperature with stirring. The entry of the argon is discontinued and the calcium chloride tube is replaced with an adapter provided with a tube to direct the escaping phosphorus oxyfluoride into the hood. The mixture is heated at reflux overnight and the chloroform is thereupon distilled off under reduced pressure (water-jet pump) at 70°. There is obtained a powdery mass which is dried for about 2 and one-half hours in a vacuum.

750 ml. of 28% caustic soda in a flask which is fitted with a reflux condenser and a thermometer are cooled to about 10° in an ice bath. The dried powdery mass is then introduced into the caustic soda medium with such care as to assure that the temperature does not rise above 30°. At the end of the addition, the pH of the so-obtained suspension should be about 10–11. If the pH is found not to be about 10–11, it should be adjusted to this level by the addition of additional caustic soda. The suspension is thereupon steam distilled and the distillate (about 350 ml.) is treated with 100 g. of sodium chloride. An organic phase and an aqueous phase forms which are separated from each other in the separating funnel. The aqueous phase is extracted 5 times with low-boiling petroleum ether (boiling point 30–45° C.) utilizing 15 ml. of the said low-boiling ether each time. The petroleum ether extracts are thereupon added to the organic phase and the resulting medium is dried with potassium hydroxide.

After distilling off the petroleum ether, there is obtained 4-methyl-5-methoxy-oxazole (boiling point 40–45° C./7 mm. Hg) by distillation under reduced pressure.

Example 2

In accordance with the method set out in Example 1, 91 g. of boron trifluoride diethyl etherate is reacted with 93 g. of d,l-N-formyl ethyl alaninate to obtain the boron trifluoride adduct of d,l-N-formyl ethyl alaninate. The molar ratio of the ethyl alaninate portion to the boron trifluoride portion of the adduct is 1:1. B.P. 145° C./ 0.02 mm. Hg; $n_D^{20}=1.4096$.

273 g. of phosphorus pentoxide and 800 ml. of absolute chloroform are introduced with argon into a 2 liter four-necked round-flask which is equipped with a glass stirrer, a reflux condenser having a calcium chloride drying-tube, a dropping funnel and a gas inlet. To this mixture, there is carefully added with stirring at room temperature 137.7 g. of the boron trifluoride adduct obtained as above and 1.9 g. of boron trifluoride diethyl etherate. The dropping funnel is rinsed with 100 ml. of chloroform. The resultant mixture is then heated at reflux temperature with stirring. The entry of the argon is discontinued and the calcium chloride tube is replaced with an adapter equipped with a tube to direct the escaping phosphorus oxyfluoride into the hood. The mixture is heated at reflux overnight and the chloroform is distilled off under reduced pressure (water-jet pump) at 70°. The residue is dried in vacuum and cooled to −40° by means of a Dry Ice/acetone mixture. 750 ml. of 28% caustic soda are then added with stirring with such caution as to assure that the temperature does not rise above 30°. At the end of the addition, the pH value of the so-obtained suspension should be about 10–11. If the pH value is found to be lower, it should be adjusted to about 10–11 by the addition of caustic soda. The reaction mixture is then steam distilled and the distillate (about 350 ml.) is treated with 100 g. of sodium chloride. An organic phase and an inorganic phase results which are separated from each other in the separating funnel. The aqueous phase is extracted 5 times with low-boiling petroleum ether (boiling point 30–45° C.) utilizing 15 ml. thereof each time. The petroleum ether extracts are thereupon combined with the organic phase and dried with potassium hydroxide.

After distilling off the petroleum ether, there is obtained 4-methyl-5-ethoxy-oxazole by distillation under reduced pressure. Boiling point 48–50°/17 mm. Hg; $n_D^{20}=1.4405$.

Example 3

In accordance with the method described in Example 1, 91 g. of boron trifluoride diethyl etherate is reacted with 102 g. of d,l-N-formyl isopropyl alaninate to give the boron trifluoride adduct of d,l-N-formyl isopropyl alaninate in which the molar ratio of alanine portion of the adduct to the boron trifluoride portion of the adduct is 1:1. The adduct boils at 130°/0.02 mm. Hg; $n_D^{20}=1.4105$.

273 g. of phosphorus pentoxide, 205 g. of a filter-aid which is stable to boron trifluoride and 800 ml. of absolute chloroform are introduced with argon into a 2 liter four-necked round-flask which is equipped with a glass stirrer, a reflux condenser with calcium chloride drying-tube, a dropping funnel and a gas inlet. To the resulting mixture, there is added carefully with stirring at room temperature a mixture of 148.2 g. of the boron trifluoride adduct obtained as above and 1.9 g. of boron trifluoride diethyl etherate. The dropping funnel is rinsed with 100 ml. of chloroform, and the resultant mixture heated at reflux temperature with stirring. The entry into the reaction vessel of the argon is discontinued and the calcium chloride tube is replaced with an adapter equipped with a tube to direct the escaping phosphorus oxyfluoride into the hood. The mixture is then heated at reflux overnight and the chloroform is distilled off under reduced pressure (water-jet pump) at 70°. There is obtained a powdery mass which is dried in vacuum for about 2 and ½ hours.

750 ml. of 28% caustic soda in a flask fitted with a reflux condenser and a thermometer are cooled to about 10° in an ice-bath. The last-mentioned dried powdery mass was introduced into the caustic soda carefully to avoid the temperature rising above 30°. At the end of the addition, the pH value of the so-obtained suspension should amount to about 10–11. If the pH is lower, it is adjusted to about 10–11 by the addition of caustic soda. The reaction mixture is thereupon steam-distilled and the distillate (about 350 ml.) is treated with 100 g. of sodium chloride. An organic phase and an aqueous phase forms which are separated from each other in the separating funnel. The aqueous phase is extracted 5 times with low-boiling petroleum ether (boiling point 30–45°) utilizing 15 ml. of the low-boiling ether each time. The petroleum ether extracts are combined with the organic phase and the resultant medium is dried with potassium hydroxide.

After distilling off the petroleum ether, there is obtained 4-methyl-5-isopropyloxy-oxazole (boiling point about 50°/11 mm. Hg) by distillation under reduced pressure.

Example 4

In accordance with the method described in Example 1, 91 g. of boron trifluoride diethyl etherate is reacted with 102 g. of d,l-N-acetyl ethyl alaninate yielding the boron trifluoride adduct of d,l-N-acetyl ethyl alaninate in which the molar ratio of the alanine portion of the adduct to the boron trifluoride portion thereof is 1:1. The adduct boils at 120°/0.005 mm. Hg; $n_D^{20}=1.4145$.

273 g. of phosphorus pentoxide and 800 ml. of absolute chloroform are introduced with argon into a 2 liter four-necked round-flask which is equipped with a glass stirrer, a reflux condenser having a calcium chloride drying-tube, a dropping funnel and a gas inlet. To this mixture, there is carefully added with stirring at room temperature a mixture of 150 g. of the boron trifluoride adduct of d,l-N-acetyl ethyl alaninate obtained as above and 1.9 g. of boron trifluoride diethyl etherate. To the resultant mixture there is added the rinse obtained by rinsing the dropping funnel with 100 ml. of chloroform. The mixture is then heated at reflux temperature with stirring. The entry of argon into the reaction vessel is discontinued and the calcium chloride tube is replaced with an adapter equipped with a tube to direct the escaping phosphorus oxyfluoride into the hood. The mixture is then heated at reflux overnight and the chloroform is then distilled off under reduced pressure (water-jet pump) at 70°. The residue is dried in vacuum for about 2 and ½ hours.

The dried residue is cooled to −40° by means of a Dry Ice/acetone mixture. 750 ml. of 28% caustic soda are then added dropwise so slowly (within two hours) that the temperature does not rise above 30°. When such addition is completed, the pH valve of the reaction mixture should be 10–11. If otherwise, the pH value should be adjusted to this level by the addition of caustic soda. The reaction mixture is then stream-distilled and the distillate (about 350 ml.) is treated with 100 g. of sodium chloride. An organic phase and an aqueous phase forms which are separated from each other in the separating funnel. The aqueous phase is extracted 5 times with low-boiling petroleum ether (30–45°) utilizing 15 ml. of the low boiling ether each time. The petroleum ether extracts are thereupon combined with the organic phase and the medium formed by this combination is dried with potassium hydroxide.

The petroleum ether is distilled off. Distillation under reduced pressure yields 2,4-dimethyl-5-ethoxy-oxazole (boiling point 56° C./10 mm. Hg); $n_D^{20}=1.4400$.

I claim:

1. A process for the preparation of compounds of the formula

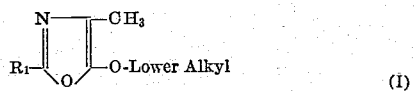

(I)

wherein $R_1$ is selected from the group consisting of hydrogen and lower alkyl which comprises reacting a compound selected from the group consisting of compounds of the formula

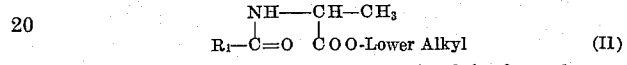

(II)

wherein $R_1$ is as above and compounds of the formula

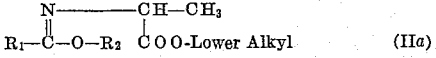

(IIa)

wherein $R_1$ is as above and $R_2$ is a hydrocarbon radical, with a member selected from the group consisting of boron trifluoride and etherates thereof of the formula $BF_3 \cdot (\text{lower alkyl})_2 O$, whereby to prepare an adduct selected from the group consisting of a boron trifluoride adduct of compounds of Formula II above and a boron trifluoride adduct of compounds of Formula IIa above and subsequently dehydrating the so-formed adduct with a dehydrating agent.

2. A process for the preparation of compounds of the formula

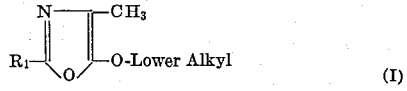

(I)

wherein $R_1$ is selected from the group consisting of hydrogen and lower alkyl which comprises reacting a compound selected from the group consisting of compounds of the formula

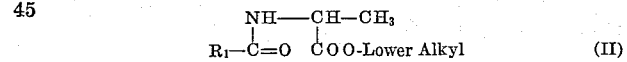

(II)

and compounds of the formula

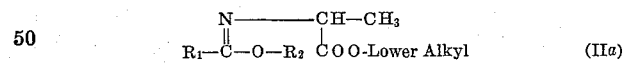

(IIa)

wherein $R_1$ is as above and $R_2$ is a hydrocarbon radical, with a member selected from the group consisting of boron trifluoride and etherates thereof of the formula $BF_3 \cdot (\text{lower alkyl})_2 O$ whereby to prepare an adduct selected from the group consisting of a boron trifluoride adduct of compounds of Formula II above and a boron trifluoride adduct of compounds of Formula IIa above and subsequently dehydrating the so formed adduct with a dehydrating agent selected from the group consisting of phosphorus pentoxide, phosphorus oxychloride, phosphorus pentachloride, phosphorus trichloride, polyphosphoric acids and thionyl chloride.

3. A process as defined in claim 2 wherein the dehydrating agent employed is phosphorus pentoxide.

4. A process as defined in claim 3 wherein at least 2.5 moles of phosphorus pentoxide are utilized per mole of the adduct to be dehydrated.

5. A process as in claim 2 wherein the member selected from the group consisting of boron trifluoride and etherates thereof of the formula $BF_3 (\text{lower alkyl})_2 O$ is provided in an excess over the amount theory indicates is required for the preparation of a 1:1 adduct.

6. A process for the preparation of 4-methyl-5-ethoxyoxazole which comprises reacting N-formyl ethyl alaninate with boron trifluoride ethyl etherate and dehydrating the so-formed boron trifluoride adduct of N-formyl ethyl alaninate with a dehydrating agent.

7. The boron trifluoride adduct of a compound selected from the group consisting of compounds of the formula

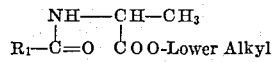

wherein $R_1$ is selected from the group consisting of hydrogen and lower alkyl and compounds of the formula

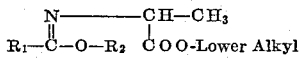

wherein $R_1$ is as above and $R_2$ is a hydrocarbon radical.

8. The boron trifluoride adduct of N-lower alkanoyl lower alkyl alaninate.

9. The boron trifluoride adduct of N-formyl lower alkyl alaninate.

10. The boron trifluoride adduct of N-formyl methyl alaninate.

11. The boron trifluoride adduct of N-formyl isopropyl alaninate.

12. The boron trifluoride adduct of N-formyl ethyl alaninate.

13. The boron trifluoride adduct of N-acetyl lower alkyl alaninate.

14. A boron trifluoride adduct of N-acetyl ethyl alaninate.

No references cited.

ALEX MAZEL, *Primary Examiner.*

HENRY R. JILES, *Examiner.*

RICHARD J. GALLAGHER, *Assistant Examiner.*